United States Patent [19]

Barone, Jr. et al.

[11] 3,723,987
[45] Mar. 27, 1973

[54] METHOD AND APPARATUS FOR MONITORING FLUID FLOW SYSTEMS

[75] Inventors: Larry F. Barone, Jr., Santa Ana, Paul E. Patterson, Bell, Ross A. Shade, Santa Ana, all of Calif.

[73] Assignee: Mobil Oil Corporation by said Patterson; ADEC Corporation, Irvine, Calif., by said Barone and said Shade

[22] Filed: Mar. 22, 1971

[21] Appl. No.: 126,506

[52] U.S. Cl. ............... 340/242, 73/196, 340/239 R, 340/248 A
[51] Int. Cl. ............................................. G08b 21/00
[58] Field of Search ............... 340/242, 239, 248 A; 235/151.34; 73/196, 40.5

[56] References Cited

UNITED STATES PATENTS 3,505,513  4/1970  Fowler et al. ................. 73/196 X Primary Examiner—Thomas B. Habecker
Assistant Examiner—Daniel Myer
Attorney—Gausewitz, Carr & Rothenberg

[57] ABSTRACT

A system for detecting leakage in a long pipeline employs meters to generate digital flow signals at stations adjacent inputs and outputs of the pipe system. A scaler function equal to the difference in the input and output flow of the system, as indicated by the meters, is computed when the system is known to be in a leak-free condition. The scaler function is combined with one of the meter representations of system input or output to provide a dynamic balance of input and output, as indicated by the meters. Subsequent deviation from balanced condition is employed to actuate an alarm. Signals from the upstream station are delayed by the amount of time required for a flow disturbance to propagate between input and output stations so as to eliminate effects of such disturbance upon the input-output comparison. Input and output flows are compared concomitantly for both short and long periods to enable rapid detection of large leaks and also detection of much smaller leaks.

5 Claims, 3 Drawing Figures

Patented March 27, 1973

LARRY F. BARONE, JR.
PAUL E. PATTERSON
ROSS A. SHADE
INVENTORS.

ATTORNEYS.

LARRY F. BARONE, JR.
PAUL E. PATTERSON
ROSS A. SHADE
INVENTORS.

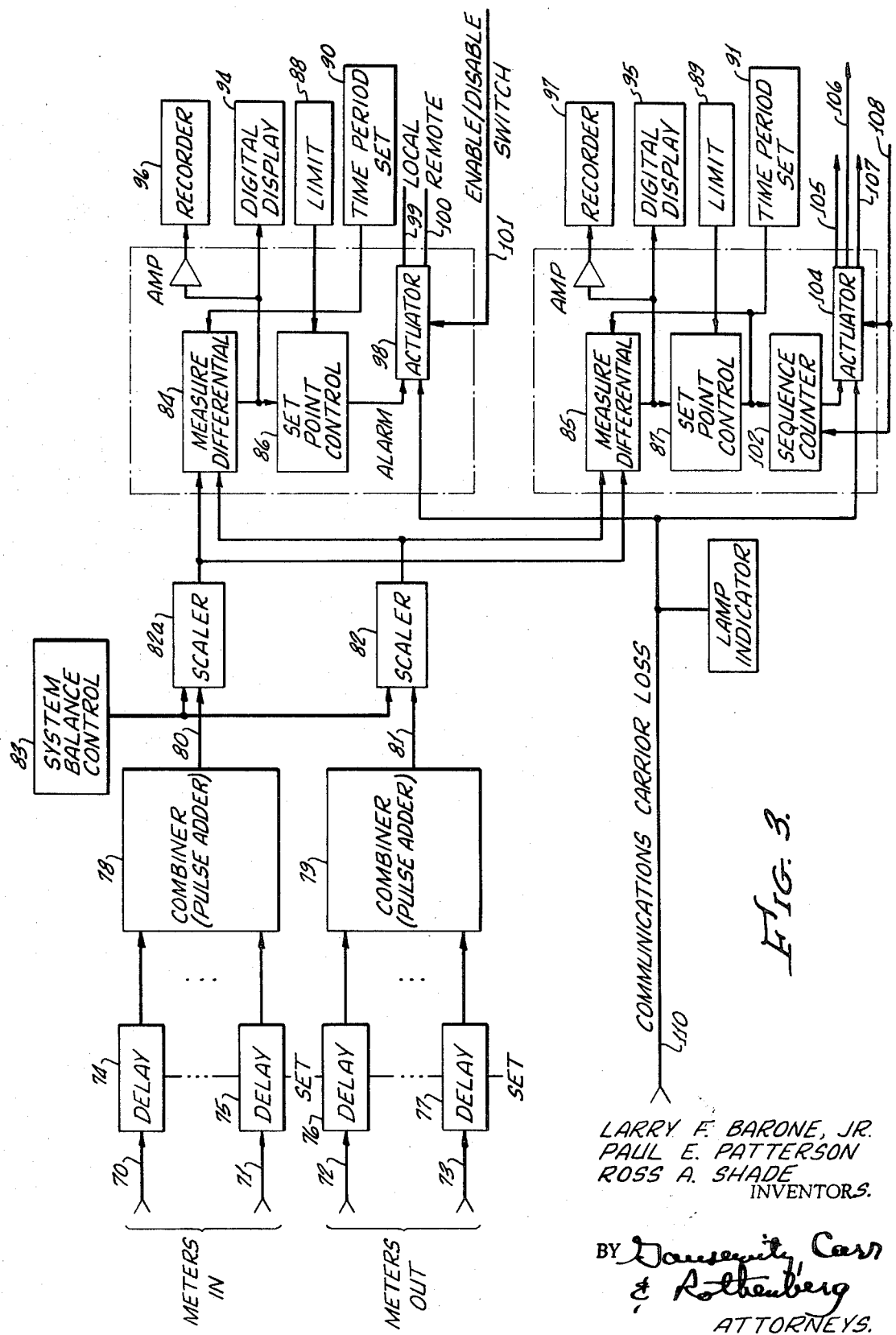

METHOD AND APPARATUS FOR MONITORING FLUID FLOW SYSTEMS

BACKGROUND OF THE INVENTION

1. Field of the Invention

The present invention relates to the monitoring of fluid flow systems, and more particularly concerns apparatus and methods that provide information of such character, precision and quantity concerning status and operation of a fluid flow system, so as to enable improved supervision.

2. Description of Prior Art

Fluid flow systems are employed in diverse industries, for distribution of water, for flow of fuel to engines of a multiple-engine aircraft, for flow of fluid employed in drilling of wells, and for transportation of fluid from one point to another. In all such arrangements, system operation may be monitored by comparing input and output flows. In general, if more fluid flows in than out, the occurrence of a leak in the system is indicated.

Accurate and prompt detection of pipeline leaks poses major problems. Pipelines employed for transport of toxic, corrosive or flammable chemicals for industry and agriculture are of increasingly common occurrence and wider extent, being located closer and closer to more and more areas of greater population density. Pipelines for transport of oil and gas and, in particular, those employed for transport of oil from offshore to onshore stations also are more prevalent. Oil and gas systems may not present as great a direct and immediate hazard to life. Nevertheless significant leakage in any of such systems will inflict substantial damage to the environment of the distribution system. Because of the immediate damage caused by the leakage of oil and gas pipelines, and regardless of the nature and extent of long-term effect on local ecology in general, leakage in such systems has resulted in widespread and even worldwide concern, major public outcry and vehement public protest. Accordingly, it is essential for purposes of public safety and preservation of local environmental conditions that such fluid flow systems be provided with monitoring systems that will maximize surveillance of the system and provide pertinent information in the shortest time, and with the greatest accuracy.

For many years, leak detection systems employed instantaneous measurements at spaced stations along a flow line, monitoring the difference between such flow measurements to obtain an indication of leakage between two points monitored. Such systems assume an hydraulic stability that cannot and does not occur in practice.

Attempting to improve upon such systems, the system of U. S. Pat. No. 3,505,513 to Fowler et al. employs a metering station at various points along a pipeline and totalizes flow at each over specific time intervals. Upon interrogation from a master station, each remote station reads out its accumulated numerical totals, which are stored and processed in the master station. Differences between accumulated flows at successive stations are compared to present limits to establish errors. The system of Fowler at al. provides only intermittent, not continuous, monitoring of the system. Further, the Fowler system is dependent upon accuracy of the individual meter measurements. Thus, it is essential that each of the meter employed in such system be accurately calibrated. Apparatus and methods for such calibration are complex and time-consuming, as shown, for example, in U.S. Pat. No. 2,851,882 to Nottingham.

A leak detection system employed by the Buckeye Pipeline Co. is described by G. A. Chilcote in an article entitled "How to Detect and Locate Leaks in Products Pipelines," the *Oil and Gas Journal*, Sept. 30, 1968, pages 94 through 98. The Buckeye system, like the system of the Fowler et al. patent, attempts to correct each input and output meter by a calibration factor so that each meter will provide an absolute quantitative measure. The Buckeye system attempts to accurately and absolutely compare each barrel of input with each barrel of output. An adjustable correction factor is employed to calibrate each meter by proving the meter against a mechanical displacement meter power.

In one proposed monitoring system employing a form of the Buckeye system, a mechanical meter prover is installed at each of some four to eight metering stations. The mechanical meter prover, including up to 50 feet of 8–10-inch pipe and related equipment, is not readily portable but is quite expensive, each installation costing about $30,000–50,000.

The above-described prior systems are useful, at best, only with homogeneous fluids, such as refined oil or relatively pure gas. Even with such use limitations and under conditions of maximized meter accuracy, the prior systems still provide a system error in the order of 0.4 percent of the flow rate. At a flow of 100,000 barrels per day, such an error would enable a leak of less than 400 barrels per day to remain undetected.

Crude oil, such as is pumped from offshore wells, for example, is a nonhomogeneous mixture of oil, gas, paraffin, water and, oftentimes, sand, varying widely and rapidly in composition, viscosity, temperature and flow rates. Such variations would introduce intolerable errors in prior-art monitoring systems should they be attempted to be used for crude oil monitoring. For such crude oil systems, it has been the practice, prior to the present invention, to make periodic pressure tests and to manually collect gross and net flow readings several times each day.

Prior-art monitoring systems recognize the fact that noise or sudden disturbances, such as sharp pressure or temperature changes, may cause false alarms or spurious error signals, particularly where the system is set to detect small leak rates. Nevertheless, these prior systems suggest handling of these false alarms only by delays in the alarm signal itself. Fowler et al. for example, suggest that the alarm counter be arranged to respond only to consecutive alarms occuring over a period of time longer than the stabilization time of the pipeline. Such an arrangement does not truly account for the disturbance in the actual measurement but in effect merely provides a coarser or degraded system resolution, compromising sensitivity to avoid such false alarms.

Accordingly, it is an object of the present invention to provide a method and apparatus for monitoring a fluid flow system so as to minimize, or eliminate, some or all of the above-mentioned disadvantages of prior systems, and to enable monitoring without primary dependence upon absolute meter calibration or meter proving equipment.

SUMMARY OF THE INVENTION

In carrying out the principles of the present invention in accordance with a preferred embodiment thereof, the difference in flow at two mutually spaced stations of a fluid flow system is indicated when the system is in a known condition. The monitoring system is dynamically balanced by modifying at least one of the indications, or an indicated difference therebetween, so as to substantially minimize such difference with said system in a known condition. Thereafter, the difference between the flow indications obtained from the two stations is monitored to provide an indication of system upset. For improved accuracy, the indications obtained at the two mutually spaced stations are relatively delayed in time in accordance with the time of propagation of a flow disturbance between the stations.

For maximum visibility of system operation, the difference between flow indications as modified is simultaneously accumulated for two periods of different durations.

BRIEF DESCRIPTION OF THE DRAWINGS

FIG. 3 is a block diagram of the electronics of a monitoring system as applied to a distribution system such as that of FIG. 2.

DETAILED DESCRIPTION

In general, the system described herein will detect either a fast or slow pipeline leakage by continuously monitoring quantized flow input and output by means of conventional flow metering devices which need not be precisely calibrated. Meter outputs are transmitted to a centrally located system totalizer which, in effect, models the critical parameters of the pipeline system and of the metering devices, and balances the monitoring system by combining a scaling function with one or more of the raw data inputs. Thus, all of the raw data is normalized to a common reference. The normalized versions of input and output flow data are compared and alarms are generated when the difference exceeds a predetermined set point.

The described leak detection system embodies three fundamental system concepts, any one of which may be employed in a monitoring system without the others, but all of which are preferably employed for optimized system surveillance. The first of these concepts is the normalizing of quantized flow measurements with respect to a common relative reference, to thereby eliminate the need for precise meter calibrations to an absolute flow. The second of these concepts is, in effect, an electronic modeling of the system flow parameters that is employed to modify one or more of the individual flow measurements in accordance with characteristics of the flow system itself. The third concept comprises the detection of two different types of leaks. One such leak is of extremely low rate that would normally tend to be hidden in system noise. A second type of leak is a high leak rate for which it is desired to minimize both the time required to detect the leak and the product loss experienced prior to detection.

Figure 1:
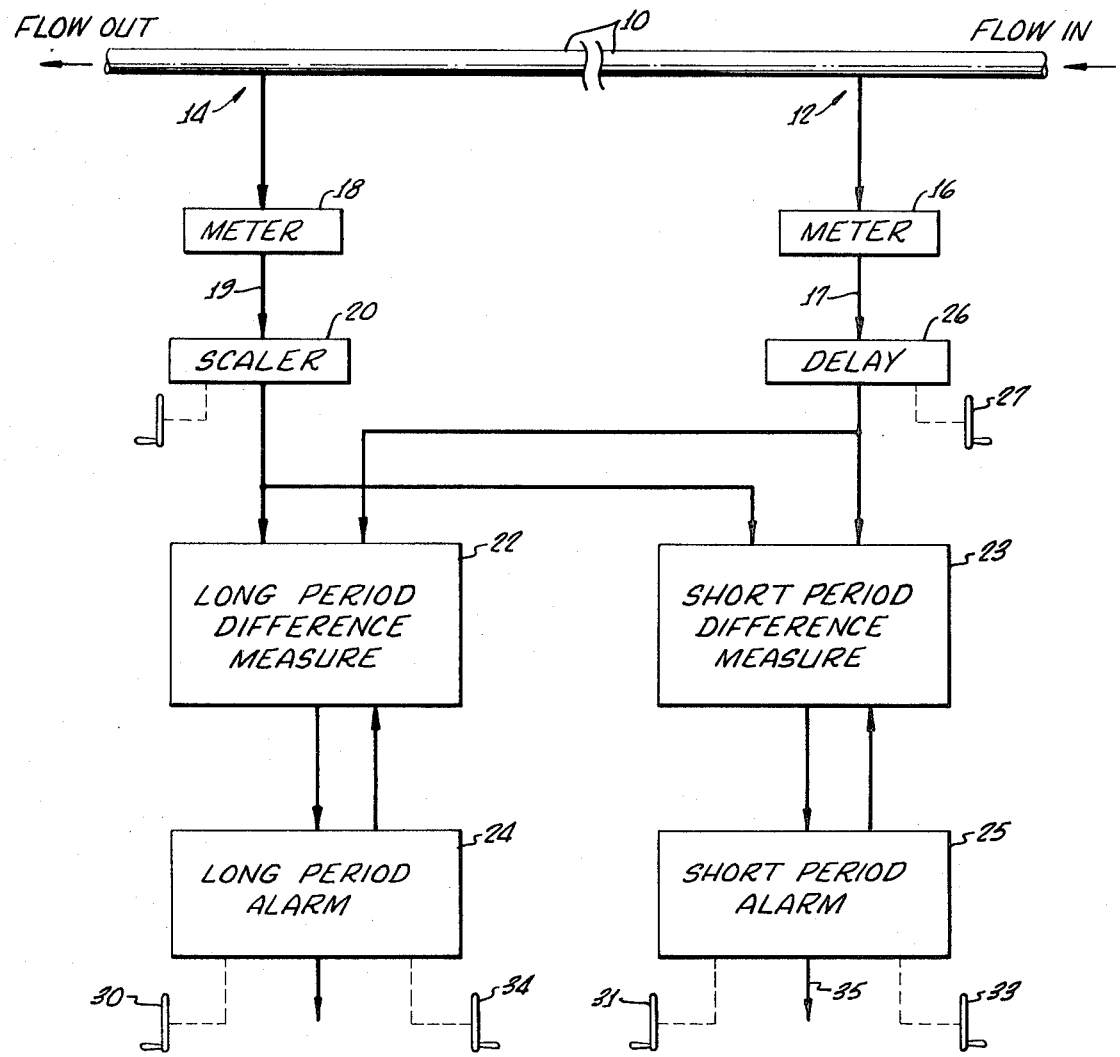
FIG. 1 illustrates principles of the apparatus and method of the present invention as applied to a single flow line.

Illustrated in FIG. 1 is a simplified version of a monitoring system applied to a fluid distribution system that comprises but a single pipeline 10. This pipeline has an upstream or input station 12 and a downstream or output station 14. To detect leaks that may occur in the system between stations 12 and 14, the described technique basically comprises a monitoring system that strives for a volumetric balance between the quantity of fluid simultaneously passing the two stations. In other words, if a barrel of fluid does not pass downstream station 14 for each barrel that passes upstream station 12, the pipeline is considered to be in a leak condition. This technique is implemented in accordance with the present invention on a relative volumetric base, as distinguished from the prior approach that employed absolute metering. Accordingly, for most pipeline applications, complex and sophisticated meter compensation techniques are not required, although performance of even a relative volumetric system can be improved by such compensation techniques. Nevertheless, departures of meter outputs from conditions of absolute accuracy impose only second order effects upon monitoring system performance.

Flow at stations 12 and 14 is indicated by conventional flow meters 16, 18 that provide electrical signals on meter output lines 17 and 19, representing the flow detected by the respective meters. Provided that the meters are reasonably accurate, although not precisely and rigorously calibrated, the indicated flow as represented by the electric signal on lines 17 and 19 may vary from the actual flow occuring at the respective stations. Variation may be due to mechanical and/or electrical differences within the respective meters. Further, relative differences in meter readings may be caused by differences in temperature and/or pressure between the two stations, such differences being of increasing importance with pipeline lengths of many miles and with varying fluid and flow characteristics.

In accordance with the present invention, such discrepancies in meter output are avoided without meter calibration by employing at least one scaler 20 to modulate or modify the signal on line 19 from meter 18, so that the difference between the output of meter 16 on line 17 and the modulated output of meter 18 is substantially zero when the pipeline 10 is in a known condition. Preferably, such known condition is a condition of zero leakage.

In practicing the method of the present invention, pipeline 10 is first tested or otherwise observed to insure that it is in a leak-free condition. Conveniently, as an example, the line may be pressure tested in static (no flow) condition. Freedom from leakage is observed over the period of the test. Shortly after completion of the test, and knowing that the system is in a leak-free or other acceptable condition, flow through the system is commenced and a suitable time allowed for stabilization of the system flow. The difference in the flow indication represented by the meter output signals on leads 17 and 19 is now determined. Preferably, the flow rates indicated on the respective lines 17, 19 are each accumulated over a given period of time, and the total flow volume, represented by the time-integrated signal on line 17, is compared with the total flow volume represented by the time-integrated signal line 19. The difference between these two, when divided by the time over which each signal has been accumulated, represents the difference in rate of the two flow rate indications. This value is the system normalizing or scaling function. This scaling function is algebraically combined with the flow signal on line 19. Thus, the monitoring system has been balanced for the tested no-leak condition of the pipeline and inaccuracies of individual meter calibrations and temperature and pressure variations at the two stations have been compensated. The difference between input and output flows as represented by the meter readings is now dynamically balanced.

The two quantities, that represented by the signal on line 17 and that represented by the output of scaler 20, are fed as inputs to a differential counter arrangement indicated in FIG. 1 as the long-period difference measure 22. If the correct scaler factor has been applied, the difference indicated at the output of the differential device 22 will continuously read zero. This difference, which may be termed the differential flow total, is then compared with a predetermined error level or set point. When the difference indicated by the differential counter device exceeds the given set point, an appropriate alarm, indicated by a long-period alarm 24 of FIG. 1, is actuated. This causes suitable action to be taken to alert operators to the discovery that the pipeline is in a leak condition.

It will be readily appreciated that the scaler function applied by scaler 20 may be applied, with suitable magnitude and sign, to both of lines 19 and 17, or to either of these alone. The arrangement illustrated is chosen solely for purposes of exposition.

A second concept of the present invention, as mentioned above, entails the modification of one or more of the meter output signals in accordance with the actual physical dynamic flow conditions of the system and its monitoring stations. Because of the compressibility of the fluid being transported (and most such fluids, even if mainly or largely liquid, have some level of compressibility), the fluid is not a perfect hydraulic medium. In particular, crude oil, as mentioned above, is a mixture of various gases and liquids of widely and rapidly fluctuating composition and flow characteristics. Density of the fluid will vary with varying pressures and temperatures. Pressures and temperatures may vary randomly at either or both of input or output stations, and may also vary with some changes in conditions of the system, such as pressure surges, variations in fluid composition and viscosity and the like. Flow rate may vary by as much as 50,000 barrels per day in a system normally handling 80,000 barrels per day.

Heuristically, the effect of these factors on a pipeline system may be described as a type of packing. That is to say, a given volume of the pipeline can contain an amount of fluid that varies in accordance with variations in composition, pressure, temperature, etc., of the system. From another point of view, one may consider the pipeline as being blocked at the output side. The total amount of fluid that can be stored in the pipeline in such condition is a function of pressure, temperature and fluid composition throughout the pipeline as well as at the input. This illustrative static situation also represents dynamic conditions.

Another factor involved in dynamic balance of the system is of increased importance in those pipeline systems covering extreme distances between input and output stations. A disturbance at the input station requires a finite time, which may be in the order of up to several minutes or more, to propagate through the line to the downstream or output station. Thus, a pressure change, or a temperature change, or a changing flow rate at the input will be rapidly reflected in the reading of the input meter, but will not be seen in the reading of the output meter until this disturbance has propagated for the distance between the two stations. The disturbance is a flow front, essentially a pressure wave, that travels the length of the pipeline at a speed directly related to the working pressure, the pipeline geometry (diameter, configuration), temperature and fluid viscosity. Upon occurrence of such a disturbance, the monitoring system may normally indicate apparent leaks or other anomaly during a period when the system is experiencing this disturbance.

In accordance with the second concept described above, there is incorporated an electronically variable time delay that physically provides relative delay of the data-bearing electronic signals from the meters in such a manner that the differential flow comparisons are made on a uniform time base. Thus, the system eliminates the effects of volumetric differences during dynamic flow condition.

As illustrated in FIG. 1, time delay is provided by interposing in the output line 17 of the upstream meter 16 a delay device 26 having a delay period that is manually variable by a control knob 27. The magnitude of delay chosen for the simple system illustrated in FIG. 1 is the time required for propagation of a disturbance from the upstream station 12 to the downstream station 14, for the type of fluid being transported by line 10. Thus, the two flow indications compared in differential counter 22 are, firstly, relatively scaled by scaler 20 to dynamically balance the monitoring system and, secondly, relatively delayed to account for propagation time of flow disturbances.

It must be understood that the zero balancing of the dynamic fluid distribution system, together with its monitoring system, is not merely a meter calibration. In making the measurements required for obtaining differential flow totals, the system is balanced not only for inaccuracies of the meters individually positioned at the several stations, but also the actual pipeline fluid distribution system itself. For such differential measurement, the distribution system or pipeline between the two monitoring stations is, in effect, a part of the meter. Therefore, the balancing that is achieved in accordance with the present invention actually accounts for the described characteristics of flow and fluid temperature change between the two stations monitored, pressure variations, volume and composition changes, viscosity changes and changes of pipe diameter in addition to inaccuracies of the meters per se.

In accordance with a third aspect of the present invention, the apparently inconsistent requirements of providing appropriate alarms for different leak conditions are solved by the use of two simultaneously operating accumulators. As previously described, the variation of flow parameters of viscosity, pressure, temperature, volume and the like makes it impossible to obtain any useful measurement from instantaneous flow rate measurements. Accordingly, flow rates are accumulated for both long and short periods of time. Input and output volumetric totals are compared. The deviation is measured against a selected reference alarm threshold level and an alarm generated when such threshold is exceeded by the measured difference.

In order to detect small leaks, the detection system must have a high sensitivity. However, even with optimum balancing and modeling of the monitoring system, there will be a certain amount of unavoidable system noise, so that very low threshold levels would result in spurious alarms. Thus, for a small magnitude leak, the difference between input and output flow in accumulated for a relatively long period, on the order of several or many hours. At the end of each such predetermined period, the accumulated error as measured by the difference is reset to zero. In this manner, the difference between balanced and corrected input and output flow indications is accumulated in the long-period difference measure or differential counter 22 which feeds to a long-period alarm detector 24, a signal representing the magnitude of this accumulated difference.

Long-period alarm detector 24 includes a first control knob 30, which sets into the detector 24 a long-period threshold with which the accumulated difference from long-period measure 22 is compared. When the threshold is exceeded, an alarm is provided on an output line 32. In order to selectively vary the time over which long-period difference is accumulated, a second control knob 34 is provided for the long-period alarm detector 24. For example, period control 34 may be set to automatically reset the differential counter 22 to zero at the end of 8-hour periods. Threshold control knob 30 may be set to cause an alarm to be generated when the differential flow as totaled by differential counter 22 exceeds 200 barrels whereby, in this example, the long-term alarm will detect a leak of as little as 25 barrels per hour. It will be understood that these numerical values are exemplary only and that actual values chosen may be varied to suit the individual characteristics of different flow systems. These exemplary values are those employed in an actual crude oil flow system in which system resolution is severely limited by its use of unstable meters having nonlinearities not better than 0.5 percent.

The described system is capable of detecting leak rates as low or lower than 0.1 percent of flow rate, when applied to flow systems of known and substantially consistent composition, using meters of 0.1 percent linearity.

It should be noted that, although the present system can tolerate lack of absolute precision of meter output, it sill depends upon stability and repeatability of the meter readings. In other words, the present system will operate satisfactorily if the meter is in error, provided such error does not vary significantly with time or change in pressure, temperature or change in flow rate. Meter linearity (as distinguished from absolute calibration) may be periodically checked, in the practice of the present invention, merely by throttling the flow and observing the flow difference accumulated for a time under such throttled flow condition. If the flow difference has substantially changed, as compared to a like period of nominal unthrottled flow, meter linearity has become degraded. If the flow difference is substantially unchanged, linearity is satisfactory.

The long-term alarm is not adequate for detection and signaling of large magnitude leaks, since these must be detected almost immediately and action taken as soon as possible to stop the flow and repair the damage. Accordingly, there is provided a short-term difference measure 23 in the form of a second differential counter that is substantially identical to the counter 22. This device receives the same input as provided to the long-period difference counter. The accumulated difference determined by the short-period counter 23 is sent to a short-period alarm detector 25, which is analogous to detector 24. In alarm detector 25, the accumulated difference is compared with a threshold level that is manually set by a control knob 31. At the end of each short interval, each having a value determined by setting of a manual control knob 33, the short-period alarm detector feeds a signal to the short-period difference counter 23 that zeros this counter so that its accumulation of the difference between input and output flows may begin anew. Since the purpose of the short-period difference counter and alarm is to provide a rapid response for large leaks, periodic zeroing of this counter occurs at considerably shorter intervals of time, such as, for example, each 15 minutes. For such intervals, a suitable alarm set point or threshold level may be 25 barrels, for example. If the difference between indicated input and output flow exceeds 25 barrels over any 15-minute interval, a suitable alarm is provided on an output line 35, so that proper action may be taken and the operators alerted.

Thus, it will be seen that the dual detection process described above operates over two different time periods. At the end of each of these periods, the leak detection accumulated error is cleared and the process begins anew at zero indicated error condition. Accordingly, if the alarm thresholds, whether for short-period or long-period, are not exceeded during the particular time period, all accumulated differential flow totals are removed from the respective accumulators and the leak detection period begins anew, completely independent of any undesired residual biases acquired or accumulated from previous periods.

When this monitoring system is in balance and no departures from the test condition have occurred, that is, no leaks exist, the accumulated error may fluctuate around a zero line. Any long-term trend or deviation from zero may be observed by continuously recording or displacing the long-term accumulated difference, to thereby enhance overall surveillance of the system. It is desirable to establish the long-term alarm threshold at a magnitude sufficiently great so that it will not be exceeded by occurrence of short-term noise. With the long-term threshold set to indicate a differential flow total of approximately 100 barrels, a short-term indication of a 25-barrel difference, whether due to an actual leak or to system noise, would not actuate the long-term alarm. However, it is possible that system noise can provide a spurious indication of a differential flow total of as much as 25 barrels. In the exemplary situation, where the short-term alarm threshold is set at 25 barrels, this alarm would ordinarily be actuated by such noise. However, because noise in the system is generally not continuous, whereas a large leak is continuous, provision is made (as described in detail hereinafter) to actuate the short-period alarm only upon detection of several rapidly occurring and consecutive differential flow totals exceeding the short-period threshold.

Not illustrated in FIG. 1, but also applicable to the system and method described therein, is an additional arrangement for detecting absolute bursts in the system such as caused by a blowout in the line. Upon occurrence of such a blowout, a major drop in pressure occurs a both sensing stations and conventional sensing pressure detection equipment may be employed to provide a suitable alarm upon detection of such a burst.

Figure 2:
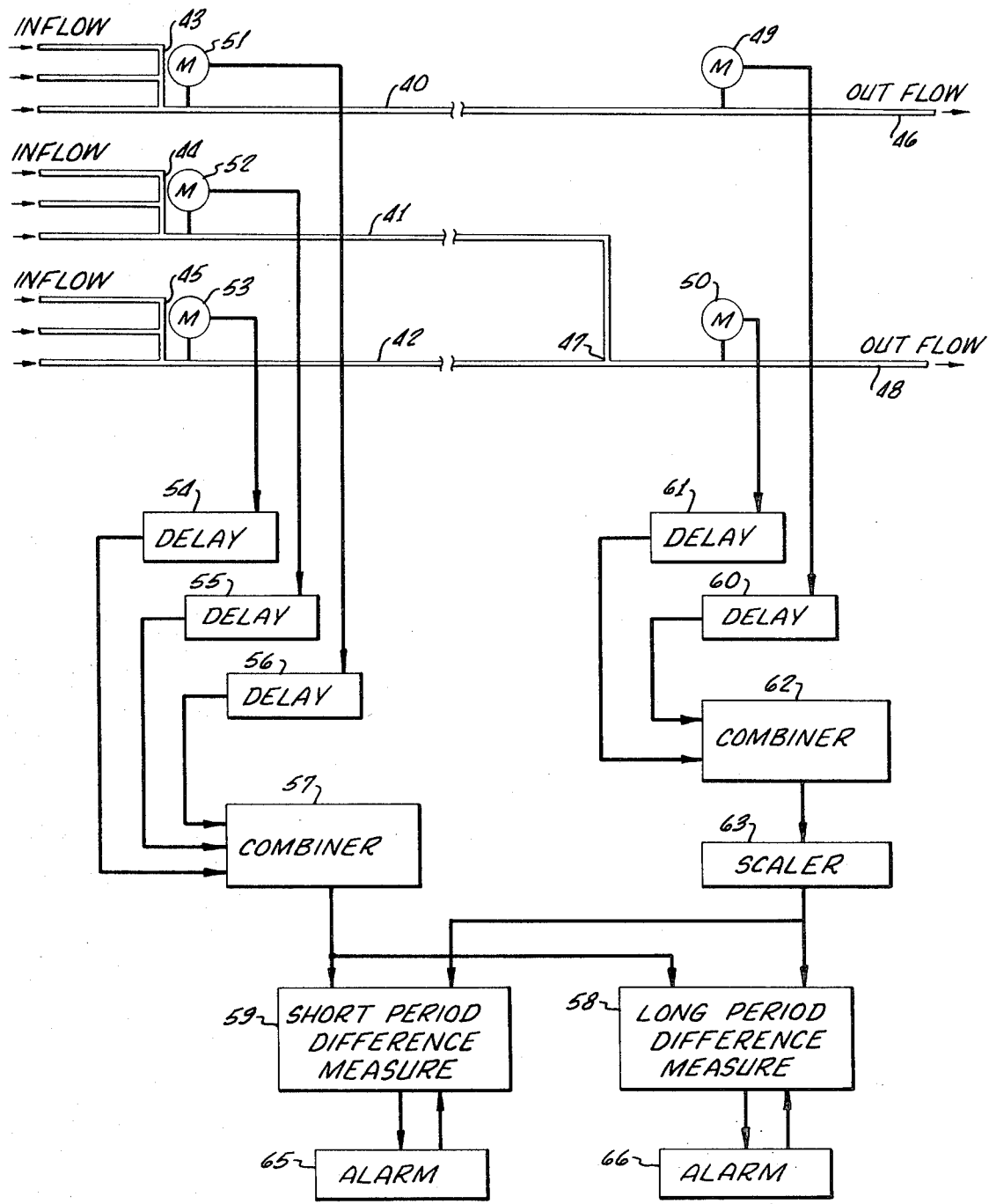
FIG. 2 illustrates a modification of the system and method of FIG. 1 for application to a fluid transport system having multiple inflow and outflow lines.

Illustrated in FIG. 2 is a monitoring system embodying principles of the present invention as applied to a fluid flow system that involves plural upstream and downstream metering stations. In the flow system of FIG. 2, three main pipelines 40, 41 and 42 carry fluid from manifolds 43, 44 and 45, respectively, each of which, in turn, receives plural inputs from a number of feed lines that may be individually connected to different ones of a large number of producing wells, for example. Many different arrangements and connections are possible and actually are employed for receiving storing or utilizing the outflow from main pipelines such as 40, 41 and 42. Two of such arrangements are illustrated in FIG. 2 for purposes of exposition. In the first of these, pipeline 40 simply provides an outflow at its downstream end 46 that is sent to an individual storage tank or the like. The downstream ends of lines 41 and 42 are joined at 47 and the common flow is then sent via a terminal portion 48 of this common line to storage or other utilization. The physical locations of several lines at the downstream end may be varied according to the needs of the particular situation. Likewise, the individual lengths of the main lines 40, 41 and 42 may be substantially equal in length or may vary significantly from one another as may be necessary or desired. Regardless of length or the location of the downstream output points of these lines, each is provided with an output flow rate meter such as indicated at 49 and 50. Input or upstream flow rate meters are provided to detect flow from each of the manifolds 43, 44 and 45. These upstream meters are indicated at 51, 52 and 53. Thus, FIG. 2 shows two substantially independent flow systems, the first comprising elements 43, 40 and 46, and the second comprising elements 44, 45, 41, 42, 47 and 48. Monitoring of the two systems is combined so as to detect a leak in either, but not identify which of the two (or both) is leaking.

The electronics of the system, including various delay circuitry, combining circuitry, differential counters, scalers, alarms and the like, may be located at any position at or remote from any portion of the fluid flow system. Conveniently, all such electronics are mounted in a single rack or plural adjacent racks of equipment and located at a single suitable location. For example, considering each manifold 43, 44 and 45 to be positioned at offshore oil and gas well platforms, or at different ones of such platforms, and considering outflow lines 46 and 48 to be located several miles away at shore stations, the electronics may be mounted in a single package and physically located on any one of the offshore platforms or at either of the onshore stations. Each meter, of course, must be physically located at the station of which it monitors flow. Suitable transmitting equipment is employed for transmission of the electrical signals provided by the meters to the various processing circuitry. Such transmitting equipment may be analog digital, hard-line or radio-wave, and may use any standard technique for transmitting and conveying electrical signals between different stations.

Each of the upstream meters 51, 52, 53 provides an electrical output signal proportional to, or substantially proportional to, (within the accuracy of the meter) the rate of flow at the respective station being monitored and feeds this signal to its individual delay circuit 54, 55, 56, respectively. After delay, the upstream meter signals are combined in combiner 57. At the output of combiner 57 is produced an electrical signal representing the sum of the flow rates monitored by meters 51, 52 and 53. This total upstream flow rate is fed as a first input to each of the differential counters of the long-period difference measure 58 and the short-period difference measure 59.

Each of the downstream meters 49, 50 feeds its electrical signal output, representing rate of flow at its individual monitoring station, through respective delay circuits 60, 61 to be summed in a combiner 62. The output of the combiner 62 represents the total of the flow rates indicated by the output or downstream meters 49, 50.

As previously indicated, one or more of the meter output signals, whether before or after its individual delay, is modulated or modified by a scaling function that is selected to dynamically balance the system in a known leak-free condition. Thus, the output of downstream combiner 62 in the illustration of FIG. 2 is fed to a scaler 63 that modifies the indicated downstream combined flow rate total so as to make it substantially equal to the indicated upstream combined flow rate total when the system is in leak-free condition. The output of scaler 63 is fed as a second input to each of the differential counters of long-period difference measure 58 and short-period difference measure 59. As previously described in connection with FIG. 1, each of the latter circuits accumulates the difference between input and output flow totals for predetermined short and long periods of time and feeds these totals to the short- and long-period alarm circuits 65, 66 in which the accumulated differences are compared with short- and long-period set points, respectively, to provide the necessary alarm when these threshold levels of the set points are exceeded by the accumulated differences for the selected periods of time.

As described in connection with FIG. 1, but not illustrated in FIG. 2, each of the delay circuits, the scaler and both of the alarm circuits are provided with manual controls to set particular values therein. Each delay can be manually varied from zero delay up to several minutes.

An individual delay separately adjustable for the individual station is provided for each meter to enable the monitoring system to be used with many different fluid flow systems of varying geometry. In determining the delay to be applied to the individual meter output signals one of the monitoring stations is selected as a time reference, although, of course, it is possible to select a time reference at a fixed time from the time of occurrence of a condition of such reference monitoring station. Preferably, the station selected for the time reference is that furthest downstream in the flow through the system. If such furthest downstream station is selected as the reference, the delay provided on its output meter would be set to zero. Each other delay is set to a value that is equal to the time required for propagation of a flow disturbance from the input station to the output station. For example, in the dual flow system illustrated in FIG. 2, delays 60 and 61 each would be set to zero and suitable values established and set into each of delays 54, 55 and 56 in accordance with the length of the individual lines 40, 41 and 42, fluid temperature, viscosity and pressure in the separate lines, and other characteristics that affect such propagation time, such as fluid density.

The scaler 63 is also provided with a manual control (not shown) to vary its modifying function. Alarm circuits 65 and 66 also are each provided with two manual controls to enable selection of the respective long- and short-period time intervals over which the differences are accumulated and to select the threshold at which the alarm is generated.

Illustrated in FIG. 3 are further details of the electronics (herein termed a differential flow totalizer) for a plural line fluid flow system of the type illustrated in FIG. 2. The particular flow systems illustrated are exemplary only and, obviously, may be of widely varied configuration. The disclosed monitoring system, shown as applied to two different systems in FIG. 1 and FIG. 2, respectively, may readily be adapted to large numbers of different types of flow system geometry and configuration. The electronics illustrated in FIG. 3 has wide flexibility for application to such diverse systems. In the totalizer of FIG. 3, the various electronic components, delay circuits, counters, combiners and the like are all of conventional construction, well known and readily available so that no detailed description thereof is necessary.

Remote monitoring of flow at all stations is accomplished by conventional turbine or positive displacement meters that conventionally provide digital output signals such as, for example, one pulse for each barrel of fluid flow. Data transmission may be direct-wire or conventional telemetry techniques. At the chosen central location, receivers accept the input-wired or telemetered information and feed it to the differential flow totalizer. It is this differential flow totalizer that is illustrated in FIG. 3. The totalizer accepts all the remotely gathered input and output data provided to it via a variety of input meter lines, of which two are indicated at 70 and 71, and via a plurality of output meter lines, of which two are indicated at 72 and 73. In an exemplary system, 16 input lines and 16 meter output lines are provided. The number of lines provides a maximum capability of the system, but not all these lines need be used for any individual flow distribution system. Further, by adding additional electronic modules, the number of lines may be increased beyond 16.

The flow totalizer accepts the remotely gathered input and output data, combines this data into total combined input an output quantities, measures the differential between input and output quantities over short- and long-term periods and compares these accumulated totals to a programmed alarm limit. When a leak is detected, as one of the accumulated totals exceeds the programmed alarm limit, appropriate relays are actuated to provide the desired alarm. The differential flow totalizer illustrated in FIG. 3 also embodies all of the electronic monitoring, including correction for time delay, scaling and pressure and temperature compensation, required for a specific application.

As indicated above, each of the input and output meter signals is accepted on one of the input lines 70 through 73 and fed to a respective one of the time delays 74, 75, 76, 77, which provide predetermined time delays as may be appropriate. The delay circuits 74 through 77 are conventional delay lines that may be programmed in varying increments for varying total delays. For example, in a system presently in use, delays up to 100 seconds are available in 0.5-second steps. Such delay line is capable of accepting pulses at a rate of two pulses per second without loss of information to provide the system with a capability of handling up to 170,000 barrels per day. Obviously, other pulse rate capacities and total delay times and resolutions may be chosen.

The outputs of each of the delay lines in the input meter group are fed to a first summing device or combiner 78, and the outputs of the delay lines of the downstream meter group are fed to a combiner 79. The two combiners are substantially identical to each other, and each will accept a serial pulse train input from a large number of input lines and will combine these multiple input pulse trains into a single serial output pulse train on output lines 80 and 81, respectively. Each combiner is driven by an external clock, which, in effect, causes it to scan the input channels automatically, and is provided with an anticoincidence feature, so that, should two input pulses appear simultaneously, at least one is delayed to enable a serial processing. Many different types of circuits known to those skilled in the art may be provided for this plural pulse train summation.

In the illustrated system, only a single scaling function is applied, as by scaler 82, interposed in the output line 81 of combiner 79. The amount of modulation and modification that is provided by scaler 82 is adjusted by a system balance control 83. The scaler is a high-speed counter that includes a comparatively high repetition rate pulse generator. For each input pulse received by the scaler, it feeds all or a selectable number of such high repetition rate pulses as one input to the differential counters 84, 85 of the long- and short-term measures, respectively. For example, the scaler will provide at its output anywhere from zero to 19,999 pulses from the scaler's high repetition rate pulse generator for each input pulse appearing on line 81.

As an example of the scaling operation, if the scaler is set at 0.50, it will provide 5,000 output pulses for every input pulse. If it is set at 1.0, it provides 10,000 output pulses for each input pulse. If set at 1.5, the scaler will provide 15,000 output pulses for every input pulse received.

The scaler also acts as a vernier, providing a higher resolution reading. Thus, a second scaler 82a is interposed in line 80. This provides no scaling function when applied as in the illustrated system and is, accordingly, set at 1.0 to provide 10,000 output pulses for each input pulse.

The outputs of scalers 82 and 82a are fed as inputs to the differential counters in each of the long- and short-period difference measuring units 84, 85. Each differential measuring unit comprises a pair of input storage registers and compares the numbers stored in its two input storage registers, requiring but a maximum time of 200 milliseconds for each such comparison. The differences are obtained and stored in an output or buffer register from which the difference digits are transferred in parallel to a respective one of the set point controls 86, 87. By means of long- and short-term limit controls 88, 89, respectively, the threshold levels are set into the set point controls 86, 87, which continuously compare these levels with the difference received from the respective measuring unit output registers. Also provided for the respective long-term and short-term differential measuring units are variable time interval counters 90, 91 that, respectively, measure long- and short-period test intervals. The time interval counters provide a clear signal to the respective difference measuring units at the end of the predetermined interval to zero all of the registers in these differential difference measuring units.

Each difference measuring unit automatically recycles to repetitively perform its subtraction operation and store the difference in its output register. Thus, the number stored in its output register will change each 200 milliseconds, although the changes may simply be a fluctuation about a given number or about zero if the system has been properly balanced.

Suitable displays and records are provided for each of the accumulated difference totals. Thus, the number stored in the buffer or output register of each difference measuring unit is fed to respective long- and short-term digital displays 94, 95 and also, via suitable amplification, to trend recorders 96, 97 that provide permanent records of the accumulated differences.

For the long-term alarm, the accumulated difference is continuously compared with the set threshold, and, when this threshold is crossed, an alarm signal is generated by means of an alarm actuator 98 that provides suitable local and remotely transmitted signals on alarm lines 99, 100. The actuator may be enabled or disabled by a manual control signal on an input line 101.

The short-term alarm provides three separate and distinct alarm conditions in order to distinguish large leak rates from spurious alarms caused by system noise. This alarm functions in a sequential fashion. Whenever set point control 87 detects a total difference that exceeds the set threshold, a signal is fed to a sequence counter 102. When sequence counter 102 is first actuated, it sends a first signal to an actuator 104 to provide a first alarm signal on an output line 105. The signal sent to the sequence counter 102 also is fed back to the difference measure unit 85 to set this to zero, and a second short-term alarm period now commences. If during such second short-term period another alarm is generated by set point control 87, sequence counter 102 counts to its second count and sends a second signal to actuator 104, which provides a second output signal on a line 106. Difference measure unit 85 is once again cleared, and a third short-term period commences. If a third successive alarm is received, sequence counter 102 counts to its third count, actuates a third relay in actuator 104 to provide a third output signal on a line 107 and once again resets the difference measure unit 85 to zero. The presence of three alarm signals on all of lines 105, 106 and 107 tells the operator that three successive short-term alarms have been detected and suitable action must be taken. Sequence counter 102 is not automatically reset. It can be reset only by the operator by means of a manual control signal fed via line 108 to enable or disable the sequence counter and its actuator.

Conventional means are provided to insure that loss of communication between or among the several remote stations is immediately noted. Accordingly, an input line 110 to the differential flow totalizer contains information that indicates presence or loss of the communications carrier. Upon loss of signal, a suitable indicator, such as a lamp 111, is actuated to apprise the operator of this condition.

The several data lines transmit information thereon by means of pulse rates. Thus, if deemed necessary or desirable, suitable digital readouts may be provided for the several operations and at various points of the data processing system, such as, for example, input or output of the delay lines or the output of the combiners to the differential measuring units. These may simply be conventional digital displays or digital counters receiving as inputs the pulses at the indicated points of the system. Also, the elapsed time interval as measured by the timer 90 may be displayed on a suitable indicator.

It will be seen that there have been described methods and apparatus for providing improved monitoring of fluid flow systems wherein precision meter calibration is not necessary, and yet increased precision and sensitivity of measurement of differential flow totals is achieved. In the described apparatus and method, absolute and finite measurements of quantities are not employed, thus enabling an increase in sensitivity of tenfold or more. In addition, transient errors in the system due to various types of flow disturbances are substantially eliminated by use of appropriate time delays.

The foregoing detailed description is to be clearly understood as given by way of illustration and example only, the spirit and scope of this invention being limited solely by the appended claims.

What is claimed is:

1. The method of monitoring a fluid flow system comprising the steps of
generating a first signal representative of flow of fluid in said system at a first station, generating a second signal representative of fluid flow in said system at a second station downstream from said first station,
normalizing said signals to a common relative reference at an acceptable flow condition of said fluid system,
concomitantly accumulating differential flow totals based upon said normalized first and second signals, over both short and long periods of time, generating a first short-period alarm when the differential flow total accumulated over said short period attains a first value that represents a relatively high leak rate, and generating a second long-period alarm when the differential flow total accumulated over said long period attains a value significantly greater than said first-mentioned value, to thereby indicate a relatively small leak rate occurring over said long period of time.

2. The method of claim 1 including the step of repetitively zeroing both of said accumulated differential flow totals at the end of each consecutive occurrence of said short and long periods, respectively.

3. In a system for characterizing the flow of fluid in a fluid flow system between a plurality of spaced metering stations, the combination comprising first means for generating a first signal representative of fluid flow at one of said stations, second means for generating a second signal representative of fluid flow at another of said stations, means for combining with one of said signals a third signal representing the difference of flow between said one and another of said stations, as indicated by said first and second signals, when said system is in a substantially leak-free condition, a differential accumulator, means for applying said first signal and said combined signals to said accumulator, means responsive to a deviation in said accumulator exceeding a specified constraint for generating a control function, a second differential accumulator for totaling the difference in flow as represented by said first signal and said modulated signal over a first time interval, said first-mentioned differential accumulator totaling the difference of the inputs thereof over a second time interval that is longer than said first time interval, and means for generating a second control function when the difference totaled by said second accumulator exceeds a second constraint, said first-mentioned constraint comprising a selected totalized flow, said second constraint comprising a selected totalized flow that is considerably less than said first totalized flow, whereby said first-mentioned accumulator will cause generation of a control function upon occurrence of leaks of relatively low rate existing for a relatively long time, and said second accumulator will cause generation of a control function upon occurrence of leaks of relatively high rate existing for a relatively short time.

4. The system of claim 3 wherein said means for generating said second control function comprises means for generating first, second and third alarm signals respectively when said second accumulator total exceeds said second constraint at three successive times, means for resetting said second accumulator to zero each time its total exceeds said second constraint, and generating said second control signal upon occurrence of the third one of said alarm signals.

5. The method of monitoring a fluid flow system comprising the steps of observing the system to insure that it is in acceptable condition, flowing fluid through the system from an upstream station to a downstream station thereof, monitoring fluid flow at said upstream and downstream stations to provide upstream and downstream indications of flow, balancing said system and said flow indications, when the system is in an acceptable condition, so as to account for differences in flow parameters at and between said upstream and downstream stations and for relative differences in flow monitoring at said stations, said balancing comprising the modification of at least one of said indications by a factor sufficient to substantially minimize the difference between said indications when said system is in said acceptable condition, relatively delaying said indications, as modified, by an amount sufficient to compensate for the time of propagation of a flow disturbance in said fluid from one of said stations to the other, thereafter monitoring the difference between said indications as so modified, whereby subsequent deviation of said difference will indicate a change in the relative flow of said upstream and downstream stations, and thereby indicate a discrepancy in the system, accumulating said monitored difference to provide indications of flow difference totals over relatively long and short intervals concomitantly, generating a first alarm signal when the long interval flow difference total exceeds a first threshold to thereby indicate relatively small leaks, and generating a second alarm signal when said short interval flow difference total exceeds a second threshold that is considerably smaller than said first threshold to thereby indicate relatively large leaks.

* * * * *